United States Patent [19]

Kruger et al.

[11] Patent Number: 4,973,496

[45] Date of Patent: Nov. 27, 1990

[54] METHOD FOR TEXTURING MAGNETIC DISKS

[75] Inventors: Bruce P. Kruger; Thomas S. Petersen, both of Rochester, Minn.

[73] Assignee: International Business Machines Corporation, Armonk, N.Y.

[21] Appl. No.: 430,562

[22] Filed: Nov. 2, 1989

[51] Int. Cl.[5] .............................................. B05D 5/12
[52] U.S. Cl. .................................... 427/129; 427/127; 427/128; 427/292; 427/444; 428/64; 428/900
[58] Field of Search .............. 427/129, 128, 131, 127, 427/444; 51/328, 292, 281 SF, 326, D19, D3; 428/64, 900

[56] References Cited

U.S. PATENT DOCUMENTS

| | | | |
|---|---|---|---|
| 4,287,225 | 9/1981 | Kneller et al. | 427/48 |
| 4,698,251 | 10/1987 | Fukuda et al. | 428/64 |
| 4,735,840 | 5/1988 | Hedgcoth | 428/65 |

OTHER PUBLICATIONS

Tsai et al., *Tribological Phenomena at the Head Disk Interface of Thin-Film Rigid Disks*, J. Vac. Sci. Technol., A7 (3) May/Jun. 1989.

*Primary Examiner*—Bernard Pianalto
*Attorney, Agent, or Firm*—Mason, Kolehmainen, Rathburn & Wyss

[57] ABSTRACT

A magnetic disk is rotated while a tape of initially abrasive free permeable cloth tape is fed around a roller in engagement with a radial region of the disk surface. A slurry with free abrasive particles is applied to the tape prior to engagement of the tape with the disk. The roller is radially oscillated and the oscillation frequency is related to the disk rotation speed to abrade grooves in the disk surface in a pattern in which grooves vary from the circumferential direction by no more than a maximum angle of 5 to 45, preferably 8, degrees. The slurry application is halted and a rinse liquid is applied to the disk surface while the feeding of clean tape continues. Thin film layers including a magnetic medium are deposited on the abraded disk surface. The groove pattern may be abraded on the entire magnetizable area of the disk surface or may be restricted to the head landing area.

12 Claims, 2 Drawing Sheets

U.S. Patent  Nov. 27, 1990  Sheet 1 of 2  4,973,496
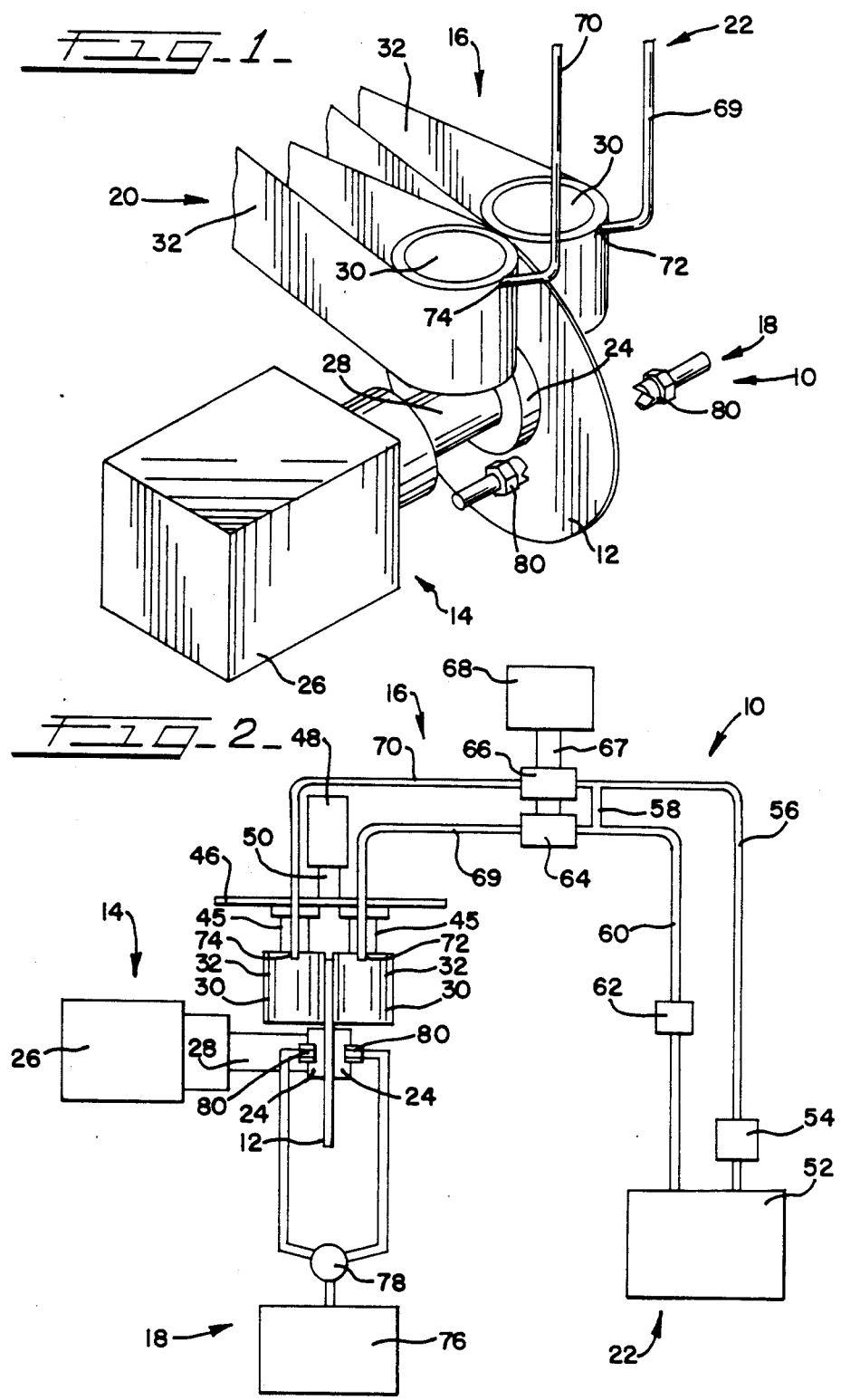

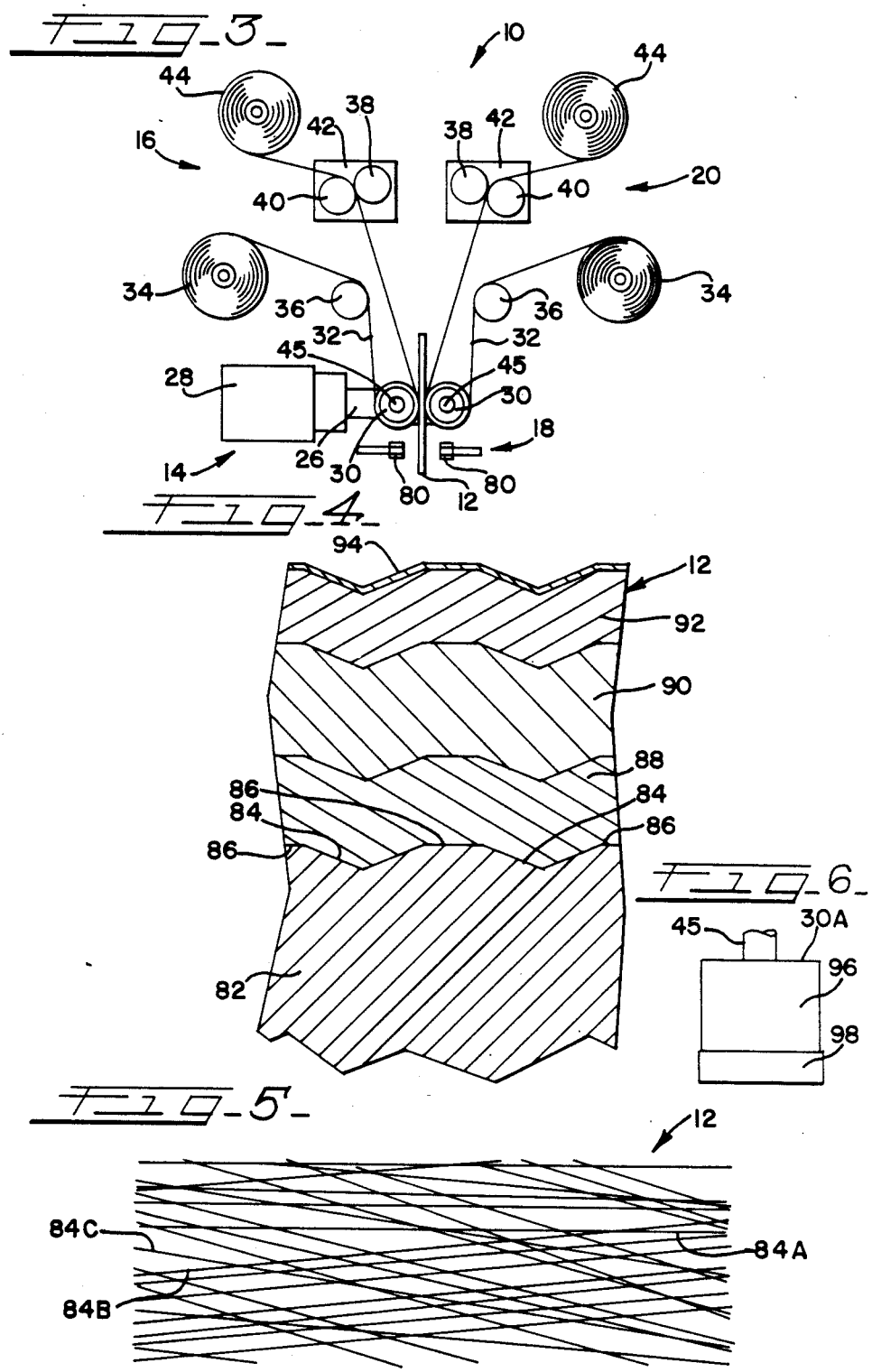

METHOD FOR TEXTURING MAGNETIC DISKS

FIELD OF THE INVENTION

The present invention relates to a method and apparatus for texturing the magnetizable surfaces of data storage disks.

DESCRIPTION OF THE PRIOR ART

Magnetic disk units are widely used in computer systems for storage of binary encoded data. These units include magnetic disks with magnetizable surfaces upon which data is written and from which data is read by magnetic heads. Due to their high magnetic density, modern high capacity disks use thin film magnetic media. In a widely used arrangement, a magnetic head rests upon the surface of the disk when the drive unit is not in use. When data is to be written or read, the disk is rotated or spun and, as a result, the head is lifted away from the disk surface by the effect of air trapped between the head and the spinning disk surface. The fly height between the disk surface and the head is extremely small.

The requirements existing at the interface of the head and the disk surface pose a number of tribology problems. The magnetic head slides on the disk surface until the disk speed is sufficient to lift the head. Surface wear resulting from head contact can remove corrosion resistant coatings on the disk and result in premature disk failure. In order to reduce wear and friction, lubrication of the disk surface is normally employed. If the disk surface is substantially, flat, the high surface energy of the lubricant results in a viscous static friction effect and this stiction increases the force neccessary to spin the disk and lift the magnetic head. Sliding contact between the head and the disk is increased and results in accelerated disk surface wear.

In order to reduce undesirable stiction, it is conventional to texture the surface of the disk in order that the head as it slides across the head landing area contacts asperities on the disk rather than a flat surface. In texturing processes, numerous small grooves or valleys are abraded in the disk surface. If the abraded pattern includes grooves arrayed with large radial components, the magnetic performance of the disk drive unit is impaired by bit shift erros due to variations in magnetic field strength under the magnetic head.

U.S. Pat. Nos. 4,287,225; 4,698,251 and 4,735,840 disclose processes for roughening or texturing magnetic disk surfaces with concentric grooves or scratches. Concentric grooves do not degrade the magnetic performance of the disk. However, with a texture consisting of circumferential grooves, the lubricant can wear off of the asperities and is not replenished, leading to increased friction and wear.

Mechanical regularity of the texture is also important to achieving the goals of long disk life and magnetic performance. If the texture configuration is uneven over the disk surface, or if asperities exceed the head fly height, wear and unsatisfactory performance can result.

It has been suggested that a texture pattern including intersecting grooves may be capable of attaining acceptable magnetic and mechanical results. A texturing process for making this type of texture pattern is described in *Tribological Phenomena at the Head-Disk Interface of Thin-Film Rigid Disks*, J. Vac. Technol. A & (3) May/June 1989. That process uses quill wheel equipment for texturing the disk surface and as a consequence cannot obtain uniform texturing at different radial disk surface regions.

Some disk texturing processes use rotating pads engaging the rotating surface of the disk and supplied with free abrasive in a slurry. The use of rotating pads for disk texturing has disadvantages in manufacturing including pad break in, pad life and difficulties in process automation. Because the pad performance varies over the life of the pad, uniform disk texture patterns are difficult to manufacture.

Another known disk surface texturing process uses tapes with fixed abrasive surfaces held in contact with the disk surfaces while the disk is rotated. This process is carried out by commercially available disk texturing equipment such as that offered for sale by Exclusive Design Company, Model 800HDF. Fixed abrasive processes have not proven satisfactory because of the lack of mechanical reliability of the textured surface. Problems have included uneven or irregular texture and nonuniform asperities.

SUMMARY OF THE INVENTION

Among the objects of the present invention are to provide a method and apparatus for texturing magnetic disks capable of providing a well regulated and even texture across all or any selected radical band of the disk surface; to provide a method and apparatus that can be controlled to provide an optimum array of grooves with selected density, intersections and orientations; to provide a method and apparatus well suited to automated manufacturing; and to provide a method and apparatus overcoming problems experienced in the past.

In brief, the objects and advantages of the invention are achieved by providing a method for texturing the surface of a magnetic disk by rotating the disk around its axis and advancing an elongated tape of liquid permeable cloth across a portion of the surface of the rotating disk. The tape is held against the disk surface and oscillated in a radial direction relative to the disk surface in the region where the tape is pressed against the disk surface. A slurry containing free abrasive particles and a slurry liquid is delivered to the region between the tape and the disk surface in order to abrade the disk surface.

In brief, an apparatus for texturing the surface of a magnetic disk in accordance with the present invention includes a disk support system for supporting and rotating the disk around its axis, an elongated tape and a tape transport system including a roller having a surface parallel and adjacent to the disk surface. The tape transport system includes tape drive means for advancing the tape along a tape path extending between the roller surface and the disk surface. The roller is positioned to hold the tape against a radially oriented region of the disk surface and means are provided for oscillating the roller in a radial direction relative to the disk surface. The tape is a liquid permeable cloth tape initially free of abrasive and a slurry delivery system introduces a slurry of liquid and free abrasive particles between the tape and the disk surface in the radially oriented region.

BRIEF DESCRIPTION OF THE DRAWINGS

The present invention together with the above and other objects and advantages may best be understood from the following detailed description of the embodiment of the invention illustrated in the drawings, wherein:

FIG. 1 is a fragmentary and partly diagrammatic perspective view of components of magnetic disk texturing apparatus of the present invention;

FIG. 2 is a partly diagrammatic front view of components of the apparatus of FIG. 1;

FIG. 3 is a partly diagrammatic top view of components of the apparatus of FIG. 1;

FIG. 4 is a greatly enlarged cross sectional view of a fragment of a magnetic disk surface textured in accordance with the present invention;

FIG. 5 is a enlarged plan view of the orientation of selected typical grooves in the surface of a magnetic disk textured in accordance with the present invention; and FIG. 6 is a side elevational view of an alternative texturing roller for the apparatus of FIGS. 1–3.

DETAILED DESCRIPTION OF THE PREFERRED EMBODIMENT

Referring now to the drawings, FIGS. 1–3 illustrate apparatus designated as a whole by the reference character 10 for texturing the magnetizable surfaces of a magnetic disk 12 in accordance with the principles of the present invention. In general, the apparatus 10 includes a disk support system 14 for holding and rotating the disk 12, an abrasive application system 16 for abrading the rotating disk 12 and a rinse system 18 for cleaning the textured disk 12. The abrasive application system 16 includes a tape transport system 20 best seen in FIG. 3 and a slurry delivery system 22 best seen in FIG. 2.

Magnetic disks of various sizes and having various constructions may be textured in accordance with this invention. A disk 12 is clamped between a pair of clamp members 24 and is held with its axis in alignment with the axis of a disk drive motor 26 and drive shaft 28. Motor 26 is operated to rotate the disk 12 about its axis.

Abrasive application system 16 includes a pair of texturing or abrading rollers 30 located on opposite sides of the disk 12. The use of two rollers 30 permits simultaneous texturing of both opposed magnetizable surfaces to the disk 12 and this provides manufacturing economies. Abrasive is introduced into the region between the rollers 30 and the surfaces of the disk 12 by the slurry delivery system 22. The rollers 30 are driven in a manner to produce both rotation and oscillation in order to texture the disk surfaces as the disk rotates.

Texturing in accordance with certain features of the present invention may be carried out by introducing a slurry containing free abrasive directly between the roller surfaces and the disk surfaces. The preferred embodiment of the invention uses the tape transport system 20 for interposing elongated tapes 32 charged with free abrasive slurry between the rollers 30 and the surfaces of disk 12. In either of these arrangements the system may be adapted for texturing a single disk surface if desired, for example by using only a single roller 30 or by applying abrasive at a single side of the disk.

Tape transport system 20 (FIG. 3) includes two similar mechanisms located on opposite sides of the plane of the disk 12 for moving the tapes 32 to opposite surfaces of the disk 12. In addition to one of the rollers 30, each mechanism includes an arrangement of spools and rollers shown in simplified form in FIG. 3 for moving tapes 32 along paths including rollers 30. Each tape 32 is initially free of abrasive and is supplied from a tape delivery reel or spool 34 and an idler and/or tensioning roller 36 to the corresponding roller 30. Tape 32 leaving the roller 32 is nipped between rollers 38 and 40, at least one of which is driven by a tape drive motor 42 for controlling the tape feed speed. Tape 32 leaving the rollers 38 and 40 is wound onto a takeup reel or spool 44.

As seen in FIG. 2, the rollers 30 are rotatably mounted on shafts 45 supported on a frame structure 46 shown in simplified form. An oscillation drive motor 48 is mechanically coupled to frame structure 46 as indicated by element 50. Perferably the motor 48 operates through a suitable cam or the like to impart a linear oscillation with a sinusoidal velocity characteristic to the frame structure 46 and thereby to the rollers 30. Each roller 30 oscillates in the direction of its axis at a speed and displacement determined by motor 48 and coupling element 50.

Slurry delivery system 22 includes a reservoir 52 in which a supply of free abrasive slurry is contained. If desired the slurry in reservoir 52 may be continuously stirred or agitated to maintain the free abrasive in suspension. A slurry delivery pump 54 continuously circulates slurry through a flow path extending from the reservoir 22 through a delivery conduit 56, a bypass conduit 58 and a return conduit 60 back to the reservoir. The continuous flow maintains the consistency of the slurry. The pressure drop across a flow restriction 62 maintains an elevated metering pump input pressure in the region of the bypass 58.

A pair of slurry metering pumps 64 and 66 are ganged for common operation by a slurry feed motor 68. Perferably pumps 64 and 66 are operated from a common shaft 67 so that slurry feed through the two pumps is equal. Accurately regulated pumps, such as peristaltic pumps, are used so that the feed of slurry is precisely controlled. Pumps 64 and 66 feed slurry respectively through slurry feed conduits 69 and 70 for delivery through nozzles 72 and 74.

As best seen in FIG. 1, nozzles 72 and 74 are positioned to dispense slurry onto tapes 32 while the tapes are on the surface of rollers 30 in the region just prior to contact with the surfaces of the disk 12. The slurry could be dispensed onto the tape at a greater distance from the disk or could be dispensed so that it is distributed evenly over the region of contact with the disk surface.

Rinse system 18 includes a supply 76 of pressurized rinse liquid. When a rinse valve 78 is opened, rinse liqiud is sprayed by a pair of nozzles 80 in a fan pattern over the textured surfaces of the disks to remove slurry from the disk prior to further processing.

The slurry used to texture the disk surfaces is a suspension of free abrasive particles in a liquid. A water based slurry is preferred because water or a water based liquid may be used as the rinse liquid. The slurry serves not only to deliver free abrasive particles to the disk contact regions but also to lubricate the disk surfaces during abrading of the surfaces. A slurry liquid consisting of water and a water soluble oil such as a commercially available grinding coolant containing glycol is preferred. One suitable water soluble oil is DARA-COOL 740 available from W. R. Grace. The preferred free abrasive is silicon carbide with a nominal particle size of 3 microns and particle size variations from about 1 to 10 microns.

Tapes 32 are sufficiently porous to permit the slurry liquid to permeate through the tape. In the region of contact with the disk abrasive is trapped and pressed against the disk surface to achieve the desired abrading action. The tape has no regular weave pattern that would result in uneven texturing. A random fiber cloth tape of nylon, cellulose or rayon is suitable.

The axis of each roller 32 is parallel to the plane of the magnetic disk 12 and is oriented radially with respect to the disk. Thus the tape 32 contacts the disk surface substantially along a radial line. One component of the relative motion at the region where the disk is textured results from rotation of the disk 12 by motor 26. The disk surface moves in the direction opposite to the tape feed direction and produces a movement component that is essentially circumferential on the disk surface. Another component of relative movement results from oscillation of the rollers 30 in the radial direction along the line contact. This produces a texture groove array including both generally circumferential grooves and additional grooves angularly disposed in both opposed directions to the circumferential direction.

At any instant, the roller 30 may be moving radially inward or radially outward or it may have little or no radial movement. In addition, the radial movement varies from none to the maximum due to the sinusoidal nature of the oscillatory drive. Thus a continuum of angular groove orientations is produced. By relating the frequency of roller oscillation to disk rotation speed, the maximum radial speed of the tape with trapped abrasive relative to the disk surface can be varied. This establishes the maximum angle by which the textured grooves deviate from the circumferential direction.

Commercially available fixed abrasive tape texturing equipment such as that available from Exclusive Design Company includes both circumferential and radial movement components. It has been found that the use of a free abrasive slurry produces for superior results, particularly when the ratio of oscillation frequency to disk rotation speed is selected to optimize results.

In carrying out the method of the present invention, a disk is loaded into the disk support system 14 and is rotated at a speed in the range of from 50 to 200 RPM, a speed of about 95 RPM being preferred. The rollers 30 are oscillated with a stroke of about one-eighth inch an an oscillation frequency in the range of from 1 to 8 cycles per second, about 3 cycles per second being preferred. The tapes 32 are advanced at a speed sufficient to introduce fresh abrasive particles uniformly to the disk surface. A tape feed speed in the range of 4 to 12 inches per minute is sufficient. Slurry is introduced by the slurry delivery system throughout an abrading cycle of approximately one minute. Because the tape is fed continuously, tape surface wear does not result in non uniform texturing.

At the conclusion of the abrading cycle, the delivery of slurry is discontinued and a rinse cycle is carried out in order to remove free abrasive particles and free particles of abraded disk material from the disk. In the absence of the rinsing cycle, remaining particles could interfere with subsequent operations.

During the rinse cycle, the disk continues to rotate and the tape feed continues in order to move abrasive particles and free particles of abraded disk material away from the disk surface contact region. Simultaneously, clean and abrasive free tape 32 continues to be fed to the disk surface. A rinse cycle of about 10 seconds occurs during which the rinse liquid is sprayed onto the disk surfaces.

FIG. 4 illustrates a fragment of the surface of a disk 12 that has been textured in accordance with this invention. The disk includes a substrate of aluminum or other suitable material provided with a hard, polished, plated layer 82 of material such as nickel-phosphorus having a thickness of approximately 14 microns. After polishing, the plated substrate 82 is textured as described above to produce grooves 84 and asperities 86 illustrated in somewhat idealized fashion.

After texturing of the substrate layer 82, thin film layers are vacuum deposited on the textured surface. These layers include an underlayer 88 of chromium having a thickness of about 350 angstroms, a magnetizable layer 90 of a cobalt alloy such as cobalt-platinum-chromium or other magnetic medium having a thickness of about 450 angstroms and a carbon overcoat layer 92 with a thickness of about 300 angstroms. A layer 94 of lubrication is applied to the exposed grooves is initially formed in the plated and polished substrate 82, and the texture is maintained as the additional layers are applied over the valleys or grooves 84 and asperities or peaks 86.

FIG. 5 illustrates positions of selected textured grooves on a small part of the disk surface, magnified in the neighborhood of one thousand times. This is an idealized representation of sufficient grooves 84 to indicate the variety of groove angles in the pattern. Some of the grooves such as groove 84A are substantially circumferential. Other grooves such as groove 84B are included at a maximum angle from the circumferential direction. Still other grooves such as groove 84C are inclined in the opposite direction at the maximum angle. The remaining grooves are inclined in opposite directions at varying angles less than the maximum angle. In accordance with the invention, the maximum angle is in the range of from 5 to 45 degrees and is preferably about 8 degrees.

In the arrangement illustrated in FIGS. 1-3, the disk is textured over the entire functional magnetizable surface. In disk drive units, contact between the magnetic head and the disk surface may be limited to a defined head landing area in the form of a radial band typically the radially inner part of the disk surface. It can be desirable to limit disk texturing to the head landing area. With the method and apparatus of this invention, this is accomplished by reducing the diameter of the rollers 30 in regions where texturing is not desired. FIG. 6 illustrates a roller 30A for limiting the textured area to a band at the radially inner part of the disk surface. The roller diameter is decreased by about 0.050 inch or so over an area 96 where texturing is not desired. This provides clearance for the free abrasive particles so that they do not texture the disk surface. The larger diameter of the remaining surface area 98 results in a band of texture in the head landing area. Alternatively, the width of the rollers 30 and of the tapes 32 may be dscreased to the width of the desited band of texture.

While the invention has been described with reference to details of the illustrated embodiment, such details are not intended to limit the scope of the invention as defined in following claims.

We claim:

1. A method for texturing the surface of a magnetic disk comprising the steps of:
   rotating the disk around its axis;
   adavncing a roller which rotates about an axis substantially parallel to the surface of the disk and about which is trained a porous material across a portion of the surface of the rotating disk;

holding the porous material against the disk surface;

oscillating the roller and porous material in a radial direction relative to the disk surface in the region where the porous material is pressed against the disk surface; and delivering a slurry containing free abrasive particles and a slurry liquid to the region between the porous material and the disk surface in order to abrade the disk surface.

2. The method of claim 1 wherein said step of advancing the roller includes advancing a tape of nonabrasive porous material which is trained over the roller surface in contact with the disk surface.

3. The method of claim 1 wherein said advancing, holding, oscillating and delivering steps are performed simultaneously on both opposed surfaces of the disk.

4. The method of claim 2 wherein said pressing step includes continuously feeding the tape around a roller and pressing the roller against the disk surface.

5. The method of claim 4 wherein said advancing, holding, oscillating and delivering steps are performed simultaneously on both opposed surfaces of the disk.

6. The method of claim 2 wherein said oscillating step includes varying the radial speed of the tape in a sinusoidal manner, and relating the frequency of radial oscillation to the speed of disk rotation in order to limit the maximum movement of the tape relative to the disk surface to the range of about five degrees to forty-five degrees from the circumferential direction.

7. The method of claim 6 wherein said oscillating step includes relating the frequency of radial oscillation to the speed of disk rotation in order to limit the maximum movement of the tape relative to the disk surface to about eight degrees from the circumferential direction.

8. The method of claim 2 wherein said holding step comprises holding the tape against a radially oriented region intersecting substantially all of the magnetizable area of the disk surface.

9. The method of claim 2 wherein said holding step comprises holding the tape against a radially oriented region intersecting only a portion of the magnetizable area of the disk surface in order to abrade a radial band within the magnetizable area.

10. The method of claim 1 further comprising discontinuing the delivery of slurry while continuing said rotating and advancing steps, and rinsing the surface of the disk.

11. The method of claim 10 said delivering step including delivering a slurry including a water soluble lubricant and said rinsing step including applying to the disk surface a rinse liquid including water.

12. The method of claim 1 further comprising depositing thin film layers including a magnetic medium onto the abraided disk surface.

* * * * *